United States Patent Office 3,371,984
Patented Mar. 5, 1968

3,371,984
AIR FRESHENER
Joseph Patrick Kelly, Staten Island, N.Y., and George Herbert Fuller, Colonia, N.J., assignors to Colgate-Palmolive Company, New York, N.Y., a corporation of Delaware
No Drawing. Filed Sept. 6, 1963, Ser. No. 307,015
9 Claims. (Cl. 21—53)

ABSTRACT OF THE DISCLOSURE

Solid air odorizing compositions, and such compositions in tablet form. The compositions contain a hydrated salt which loses some water of hydration when air is passed thereover at a rate of at least about 25 cubic feet per minute, and a perfume intimately admixed therewith.

---

This invention relates to odorizing of air with a solid air odorizing composition and to a process for using the same. More specifically, the present invention is concerned with odorizing of air in connection with vacuuming of soiled surfaces.

In removing dust, dirt, etc., in the vacuuming of floor coverings, draperies, furniture and the like, a musty odor is generally left in the atmosphere. The air used to carry dust and the like from a soiled surface to a vacuum cleaner and the collector or receptacle portion thereof acquires odors of the particles and, when expelled from the vacuum cleaner, conveys such odors to the atmosphere. In this way, a musty odor—generally associated with dusty areas—is imparted to the atmosphere proximate to the area being cleaned. This is undesirable from an aesthetic standpoint. In addition, a health hazard is present by virtue of microorganisms collected in the receptacle portion (e.g., a bag or the like) of the vacuum cleaner and by virtue of some of the microorganisms being removed from the soiled surface and being airborne in the air expelled from the cleaner. The present invention is directed to obviating such problems.

It is an object of the present invention, therefore, to odorize air with a pleasant fragrance. It is a further object of the invention to provide a solid air odorizing composition. Another object of the invention is to provide a solid air odorizing composition from which a perfume can be slowly diffused to the atmosphere. Another object of the invention is to provide such a solid composition having a substantially long useful life. A further object of the invention is to provide such a solid composition containing an antimicrobial agent. Still another object of the invention is to provide a process for odorizing air with such a composition. A related object is the provision of a process for removal of dirt and dust and the like from a soiled surface with vacuum means and simultaneous odorizing of air proximate to said soiled surface with a solid perfumed composition of the character indicated above. Other objects of the invention will be apparent from the following description.

Broadly stated, according to the present invention, the foregoing objects are realized with compositions comprising a solid inert supporting material containing water of hydration and capable of releasing water of hydration when air is passed thereover and a perfume intimately admixed therewith.

The solid inert supporting materials, as indicated above, contain water of hydration. It has been found that some water of hydration must be present with the supporting materials in order that there be slow disintegration of the composition containing the same when air is passed thereover, particularly when the air flow is at a rate of at least about 25 cubic feet per minute and preferably in the range of 25 to 75 cubic feet per minute. Supporting materials contemplated herein are hydrated salts (particularly, inorganic) with irreversibly lose at least some water of hydration to a suitable flow of air. Representative salts are carbonates, sulfates, etc., typical of which are alkali metal carbonate hydrates, magnesium sulfate hydrates, etc., in particular sodium carbonate decahydrate, sodium carbonate trihydrate and magnesium sulfate heptahydrate known as Epsom Salts. The latter two hydrates are particularly preferred herein.

A perfume or perfumes characterize the compositions of this invention. A wide variety of perfumes can be used herein. Such can be selected from types generally classified in the following manner: light, sweet floral, oriental type, oriental bouquet; lavender bouquet; woody bouquet; aldehydic; conifer; mossy; etc. The concentration of perfume in the solid air odorizing compositions will generally range from about 1 to about 10 percent by weight of the total of the inert supporting material and perfume; preferred concentrations are from about 3 to about 5 percent by weight.

As indicated above, an antimicrobial agent can be present in the composition of this invention. Such agents serve to keep the bacteria in the collector of a vacuum cleaner at a relatively low level. Suitable agents are 2,2' methylene bis (4-chlorophenol), generally referred to as dichlorophene; and 2,2'methylene bis (3,4,6 trichlorophenol), generally known as hexachlorophene. The concentration of an antimicrobial agent will generally range from about 1 to about 2 percent by weight of the solid compositions of this invention.

While the solid compositions can take many forms for use in accordance with this invention, it has been found that effective use is obtained with tablets of the compositions. The tablets can be various sizes and shapes. Particularly effective are tablets having a diameter of about ½ inch and a thickness of about 3/16 inch. The tablets are advantageously formed with a pressure of about 70 kilograms per square centimeter in a hand operated tablet machine type A/B tablet press, distributed by Chemical and Pharmaceutical Industry Co. Inc., New York, N.Y. It is to be understood, however, that other suitable tabletting equipment can be used. Such tablets are eminently suitable for use when placed in a vacuum cleaner bag. It is to be understood, however, that tablets and particles of other sizes, shapes and weights can be utilized in other applications for odorizing air. For example, when the compositions are used in connection with air conditioning or heating units, considerably larger tablets can be used. Thus, the compositions of this invention comprise a solid mass of at least granular size. Particles which present maximum surface area immediately are not suitable. Such particles release excessive amounts of perfume too rapidly and the long useful life of the compositions is not attained.

While it is to be understood that the invention is not to be limited by any theoretical considerations, it appears that the perfume present in the compositions of this invention is dispensed into the air in several ways. The perfume is dispensed from the surface of a tablet by slow diffusion thereof from the interior of a tablet to the surface. It is also dispensed into the air from the fresh surface which is exposed when the old surface of a tablet crumbles at it loses water of hydration to the air passing over it.

The solid compositions, and particularly tablets, are readily formed by mixing a perfume with a suitable solid inert supporting material. For example, a perfume can be added to sodium carbonate trihydrate and thoroughly admixed therewith and the resulting powder ground to a fine size. This powder can then be pressed into suitable tablet size in a press of the type indicated above. A perfume can also be mixed with sodium carbonate trihydrate, and the resulting mixture can be tumbled in a jar until a homogenous mixture is formed. The homogeneous mixture is then pressed into suitable tablet size.

The present invention is more fully described and exemplified in the following examples. It is to be understood, however, that the invention is not to be limited to any specific form of materials or conditions set forth in the examples, but is limited solely by the description in the specification and the appended claims. All quantities are expressed in parts by weight unless otherwise indicated.

*Example 1*

Five parts by weight of a perfume having a conifer fragrance and 0.1 part by weight of a green dye (for aesthetic appeal) were mixed thoroughly, and the resulting mixture was added to 94.9 parts by weight of sodium carbonate trihydrate. The resulting mixture was ground to a fine powder in a mortar and then mixed intimately in a Twin Shell Blender. The mixture taken from the blender was then pressed in the tablet press identified above, operated at a pressure of about 70 kilograms per square centimeter. The tablets were of a size of ½ inch diameter and 3/16 inch thickness, with a weight of about 1.4 grams each. This product is identified as Product 1.

*Example 2*

A product—identified herein as Product 2—was made as described in the preceding example except that a corresponding amount of Epsom Salts ($MgSO_4 \cdot 7H_2O$) was used in place of sodium carbonate trihydrate.

A test program was conducted with Product 1 by placing from 10 to 12 of the tablets in a vacuum cleaner bag (replaceable bag) of an RCA Whirlpool "Bambi" tank-type vacuum cleaner, and using the vacuum cleaner containing the same twice a week for a period of four weeks (customary vacuum cleaner usage). The air flow rate of the cleaner is about 65 cubic feet per minute. As dirt and dust and the like were removed from carpeting and other furnishings, the perfume was expelled into the atmosphere. It was found that the tablets perfumed and freshened the air which passed through the vacuum cleaner to a desirable extent and that the tablets were effective for a period of about four weeks. It was also found that residual matter from the tablets did not interfere with vacuum operation, nor did an accumulation of dust in the vacuum bag decrease perfume odor to any substantial extent.

A subsequent test program with a variety of vacuum cleaners demonstrated that the performance of the tablets was similarly satisfactory.

It is to be understood that not only can the tablets be introduced directly into a vacuum cleaner bag or other collecting means, but can be associated with the vacuum cleaner in a number of other manners so long as air flowing through the vacuum cleaner contacts the solid composition, particularly as the air is expelled from the cleaner. When used in a vacuum cleaner bag, for example, the tablets remain useful, as an integral part of the vacuum cleaner, for each use of the cleaner after the introduction of the tablets until replacement of a disposable type of bag or until emptying of the permanent bag is required.

It will be apparent to those skilled in the art that the solid compositions of this invention can be used for odorizing air in a number of ways, in addition to the preferred illustration involving a vacuuming operation. For example, the solid compositions can be present in an air-conditioning unit such that the cold flow of air expelled therefrom will carry with it fragrance of the perfume present in the solid composition. In such a unit, the tablets or other particles can be placed advantageously in the air stream in a suitable container through which or over which the air stream passes. The compositions can also be used in a hot air heating system when placed in the ducts thereof such that the warm air expelled will carry with it the fragrance. Other uses include freshening of the air in conveyances including cars, busses, trains, aircraft. The compositions can also be used for freshening of air when no cleaning operation is associated therewith. For example, a forced draft of air from a stationary vacuum cleaner can be used; also a flow of air from a fan or the like can be contacted with the solid compositions described herein.

While the invention has been described in detail according to preferred compositions and to preferred processes for using the same, it will be obvious to those skilled in the art that changes and modifications can be made without departing from the spirit or scope of the invention, and it is intended in the appended claims to cover such changes and modifications.

We claim:

1. A solid air odorizing composition in tablet form which during successive exposures to air flow is adapted to controllably release a pleasing odor comprising a hydrated salt which loses at least some water of hydration when air is passed thereover at a rate of at least about 25 cubic feet per minute thereby causing the surface of the tablet to crumble whereby a fresh surface is exposed, and a perfume intimately admixed therewith, said perfume being present in an amount from about 1 to about 10% by weight and distributed throughout the solid air odorizing composition.

2. A solid air odorizing composition according to claim 1 including from about 1 to about 2% by weight of an antimicrobial agent.

3. A solid air odorizing composition according to claim 1 wherein the hydrated salt is a magnesium sulfate hydrate.

4. A solid air odorizing composition according to claim 3 wherein the magnesium sulfate is magnesium sulfate heptahydrate.

5. A solid air odorizing composition according to claim 1 wherein the hydrated salt is an alkali metal carbonate hydrate.

6. A solid air odorizing composition according to claim 5 wherein the carbonate is sodium carbonate trihydrate.

7. In combination, a vacuum cleaner having a casing and collector means therein through which air flows at a rate of at least about 25 cubic feet per minute, and air odorizing tablets in said collector means, said air odorizing tablets comprising a hydrated salt which loses some water of hydration when air is passed thereover at a rate of at least about 25 cubic feet per minute thereby causing the surface of the tablets to crumble whereby a fresh surface is exposed, and a perfume intimately admixed therewith, said perfume being present in an amount from about 1 to about 10% by weight and distributed throughout the tablets.

8. A process for odorizing air which comprises subjecting a solid air odorizing composition containing a hydrated salt and a perfume intimately admixed therewith to a flow of air at a rate of at least 25 cubic feet per minute, said flow of air slowly disintegrating the solid composition and contacting the perfume with air whereby perfume is released into the atmosphere.

9. A process for odorizing air during successive uses of a vacuum cleaner having a vacuum cleaner bag and vacuum means which comprises placing in the vacuum cleaner bag a plurality of air odorizing tablets containing a hydrated salt and a perfume intimately admixed therewith, said perfume being present in an amount from about 1 to about 10% by weight and distributed throughout each air odorizing tablet, subjecting the air odorizing tablets to a flow of air at a rate of at least 25 cubic feet per minute by said vacuum means, said flow of air slowly disintegrating the tablets as perfume is dispensed therefrom and expelling fragrantly odorized air from said vacuum cleaner bag by said vacuum means to the atmosphere.

References Cited

UNITED STATES PATENTS

Re. 18,915  8/1933  Ell _____ 21—127
1,847,233  3/1932  Bilde.

FOREIGN PATENTS 3,885     1876    Great Britain.
570,239   6/1945  Great Britain.

MORRIS O. WOLK, *Primary Examiner.*

J. ZATARGA, *Assistant Examiner.*